United States Patent [19]

Buthmann et al.

[11] Patent Number: 4,932,211
[45] Date of Patent: Jun. 12, 1990

[54] INTERNAL COMBUSTION ENGINE CHARGING UNIT

[75] Inventors: Peter Buthmann, Gelsenkirchen; Joachim Kotzur, Oberhausen, both of Fed. Rep. of Germany

[73] Assignee: MAN Gutehoffnungshütte GmbH, Oberhausen, Fed. Rep. of Germany

[21] Appl. No.: 241,024

[22] Filed: Sep. 2, 1988

[30] Foreign Application Priority Data

Sep. 4, 1987 [DE] Fed. Rep. of Germany ....... 3729583
Dec. 5, 1987 [DE] Fed. Rep. of Germany ....... 3741286

[51] Int. Cl.⁵ ............................................. F02B 37/10
[52] U.S. Cl. ................................................... 60/607
[58] Field of Search ..................... 60/598, 605.1, 607, 60/608, 624

[56] References Cited

U.S. PATENT DOCUMENTS

| | | | |
|---|---|---|---|
| 2,292,233 | 8/1942 | Lysholm | 123/559.1 |
| 2,372,676 | 4/1945 | Kilchenmann | 60/607 |
| 2,375,006 | 5/1945 | Larrecg | 60/598 X |
| 2,507,946 | 5/1950 | Waeber | 60/607 |
| 2,929,198 | 3/1960 | Crocchi | 60/608 |
| 3,238,713 | 3/1966 | Wallace | 60/608 |
| 4,145,888 | 3/1979 | Roberts | 60/608 |

FOREIGN PATENT DOCUMENTS 123878 4/1946 Australia ............... 60/607

Primary Examiner—Michael Koczo
Attorney, Agent, or Firm—McGlew & Tuttle

[57] ABSTRACT

An internal combustion engine charging unit is disclosed which includes a displacement compressor connected to a drive shaft of an internal combustion engine so as to be driven by the internal combustion engine. The displacement compressor is preferably a screw compressor including a main rotor and a secondary rotor. An exhaust gas turbine is connected to an exhaust line of the internal combustion engine. The shaft of the gas turbine is preferably connected to one of the main rotor, secondary rotor or both the main rotor and the secondary rotor.

5 Claims, 8 Drawing Sheets

INTERNAL COMBUSTION ENGINE CHARGING UNIT

FIELD AND BACKGROUND OF THE INVENTION

The invention relates to a compressor according to the displacement principle for charging internal combustion (I.C) engines.

Exhaust gas turbocharging of I.C. engines as well as charging with compressors which operate according to the displacement principle is today's state of the art.

Nevertheless, exhaust gas turbochargers, mechanically driven turbochargers as well as compressors, which operate on the basis of the displacement principle, for example as exhaust gas screw chargers or screw chargers have some disadvantages:

to achieve the required pressure ratio high circumferential speeds are necessary. For the that reason, the charging effect is very low when starting the engine ("turbo hole")

at lower I.C. engine power only moderate degrees of efficiency are achieved, especially in partial load operation the operating limit is given by the pumping limit of the compressor the operating characteristic which increases steeply with speed has an unfavorable effect on the torque response of the I.C. engine which can only be improved with costly measures (blowing off exhaust gases or charging air, charging pressure regulation).

The advantage is that the exhaust gas turbo chargers take the entire energy required for compressing the charging air from the exhaust stream.

The advantages of displacement principal (Kv) charging units consists in that even at low speeds it has a high pressure ratio for charging it has no pump or surge limit it has high degrees of partial load efficiency and an operating characteristic which is flat with the engine speed this achieves also at low engine outputs high degrees of efficiency.

The disadvantage of the displacement principal charging unit consists in that the energy required for driving the compressor is taken from the I.C. engine over the entire operating range (mechanical coupling with the engine).

This disadvantage is met, for example in the exhaust gas screw charger in that through a screw expander (-engine) a part of the exhaust gas energy is gained back and again supplied to the screw charger via the mechanical coupling of screw expander and charger.

The disadvantage of this exhaust gas screw charger, however, lies in that the screw expander has a relatively large constructional volume low play must be retained at low and high exhaust temperatures the screw expander can only be manufactured at high manufacturing costs.

SUMMARY AND OBJECTS OF THE INVENTION

It is the task of the invention to create a charging unit which, on the one hand, utilizes the advantages of the displacement principle as a charger as well as the advantages of exhaust gas turbines, however, avoids the above mentioned disadvantages.

By combining this charging unit with the I.C. engine a high starting torque with simultaneous optimum fuel utilization of the I.C. engines is realized.

This utilizes the exhaust energy in an exhaust gas turbine and gives it off to the displacement principle charger which, moreover, is mechanically coupled with the I.C. engine. During the start of the I.C. engine a high charging pressure is already built up by the compressor which operates according to the displacement principle by taking up power $P_L$ while the exhaust gas turbine which operates according to the dynamic principle only gives off very low power $(P_t)$.

The power $(P_L-P_T)$ lacking for the compression in the screw charger is transmitted by the I.C. engine via the drive journal to the displacement principle charger. With increasing speed the power fraction $(P_T)$ of the exhaust gas turbine increases. At high speeds the exhaust gas turbine can supply more power than the displacement principle charger requires. The excess power is then mechanically transmitted via a rotor of the displacement principle charger to the I.C. engine.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiment of the invention are illustrated.

DESCRIPTION OF THE PREFERRED EMBODIMENTS

Figure 1:
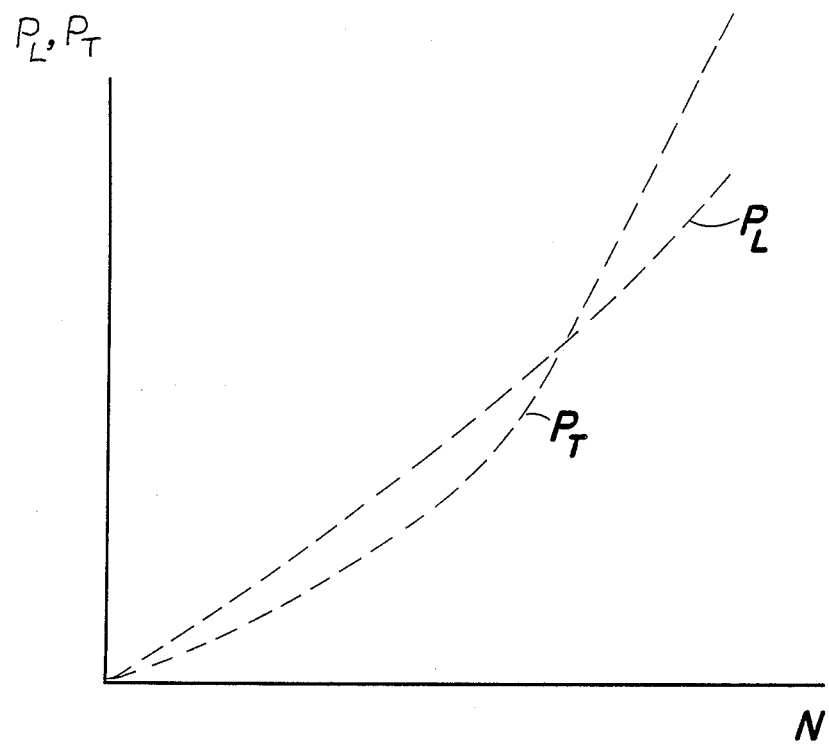
FIG. 1 shows the qualitative power consumption $P_L$ of a screw charger and the power output $P_T$ of an exhaust gas turbine as a function of speed N.

Referring to the drawings, in particular, wherein like reference numerals designate similar or like parts throughout the several views, the figures show a charging arrangement for an internal combustion engine including a displacement screw charger 7; first transmission means such as a belt drive 9 connected to the main shaft of an internal combustion engine, an exhaust gas turbine and second transmission means connecting the exhaust gas turbine to a shaft of the displacement screw compressor. The second transmission means 6 may advantageously include gearing for altering the transmission between the displacement screw charger 7 and the exhaust gas turbine 5.

To achieve optimum speed of the exhaust gas turbine it may be best to provide gearing between the displacement principle charger and the exhaust gas turbine.

A particularly compact construction results if the transmission gearing between displacement principle charger and the exhaust gas turbine is arranged on the same side as the synchronizing gearing of the displacement principle charger.

For optimum adaptation of the displacement principle charger to the I.C. engine gearing between the I.C. engine and displacement principle charger may become necessary, for example implemented as toothed belt gearing.

Depending on the speed of the displacement principle charger rotors it may become necessary to couple the exhaust gas turbine with the main or secondary rotor of the displacement principle charger in order to achieve maximum speeds with the exhaust gas turbine.

The torque between main and secondary rotor can be transmitted either through synchronizing gearing or through the profile region of the rotors of the displacement principle charger in order to achieve a shorter as well as a simpler structure.

In power transmission via the rotors it is of advantage with respect to decreasing wear to temper the rotors or to coat them.

It is advantageous to build the displacement principle charger as a screw charger since this implementation permits high speeds. High speeds are in general also achieved with exhaust gas turbines so that in coupling with the screw charger low transmission ratios occur which most frequently permit single-stage gearing as far as direct coupling cannot even be realized.

In most cases it is advisable to drive the screw charger via the main rotor in particular if it has the greater power requirement.

The exhaust gas turbine can be implemented as a radial or axial turbine depending on volume flow and pressure of the exhaust of the I.C. engine.

A particularly compact construction results if the runners of the exhaust gas turbine are arranged in overhung position on the shaft journal of the rotors respectively the transmission gearing between displacement principle charger and exhaust gas turbine.

Figure 2:
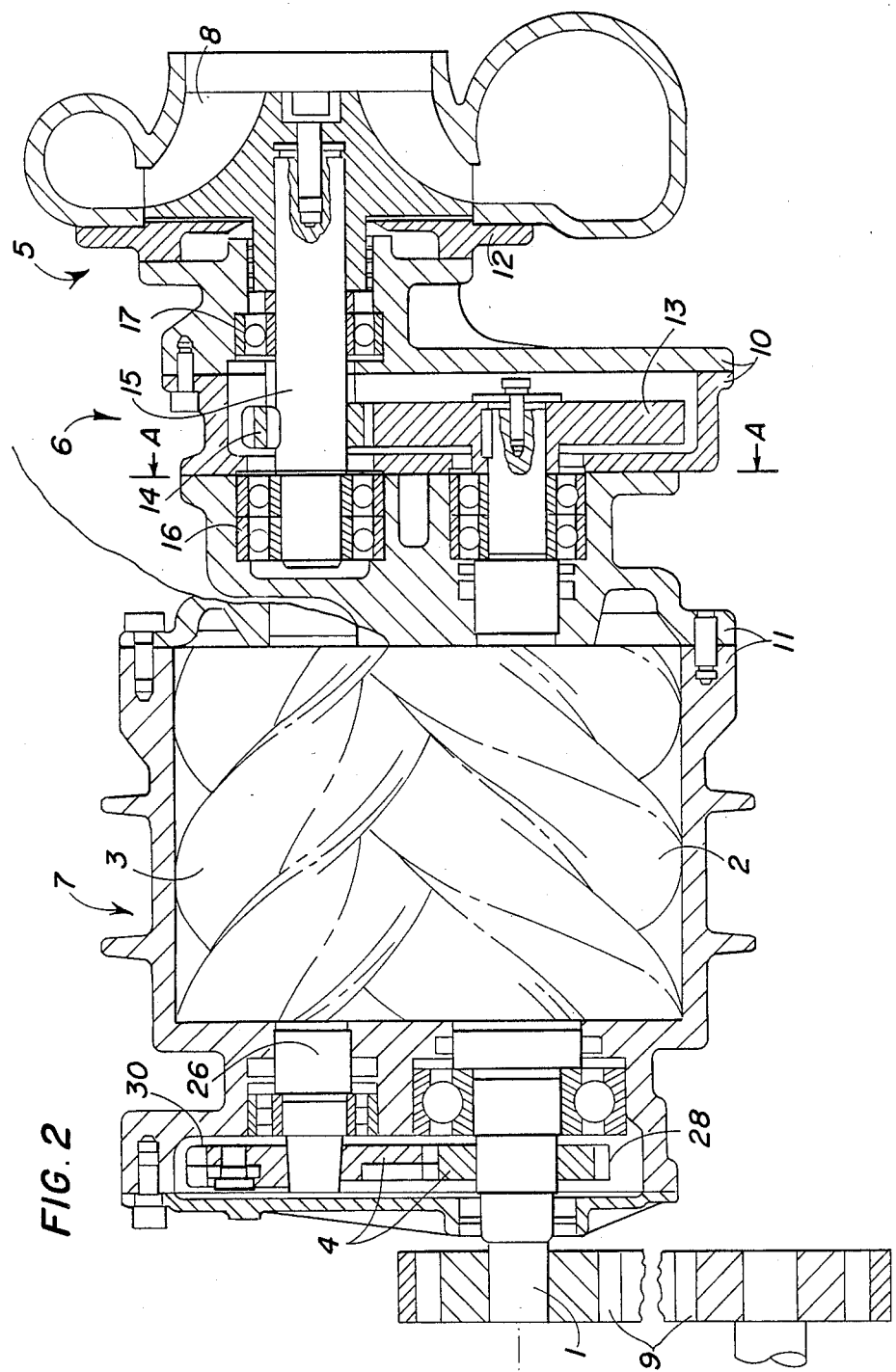
FIG. 2 is a longitudinal section through a displacement principle charger, formed as a turbo screw charger with synchronizing gearing and transmission gearing between a radial turbine and a screw charger.
Figure 3:
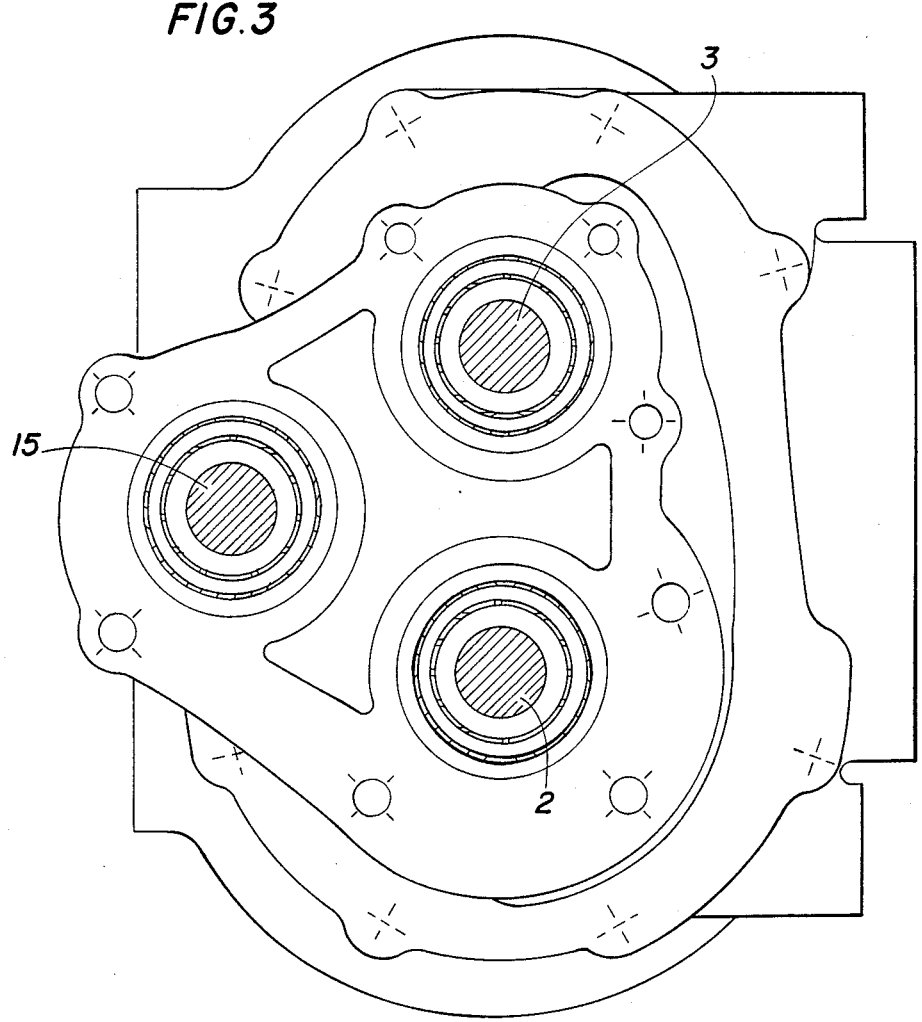
FIG. 3 is a section in plane A—A according to FIG. 2.

In the turbo screw charger shown in FIG. 2, a connection exists between the shaft journal 1 of the screw charger 7 and the internal combustion (IC) engine (not shown in FIG. 2), here in the form of belt drive 9. While the secondary rotor 3 of the screw charger is driven by the main rotor 2 via synchronizing gearing 4, the exhaust gas turbine 5 is coupled with the main rotor 2 via transmission gearing 6. In this way, the power supplied by the exhaust gas turbine 5 is transmitted directly to the main rotor 2 of the screw charger 7. The power taken up by the I.C. engine via the shaft journal 1 is reduced by this amount.

In the case shown in FIG. 2 the turbine is implemented as a radial turbine 5, with its runner 8 arranged in overhung position on the gear shaft 15.

The gear box 10 is flanged between the housing 11 of the charger and the housing 12 of the exhaust gas turbine. The gear wheel 13 is arranged in overhung position on the shaft of the main rotor 2. The gear wheel 14 is arranged between bearings 16 and 17 on the same shaft 15 as the turbine runner 8 The bearing 16 here is integrated in the charger housing 11.

All bearings of the charging unit are drawn here as antifriction bearings but they can also be implemented as friction bearings.

Figure 4:
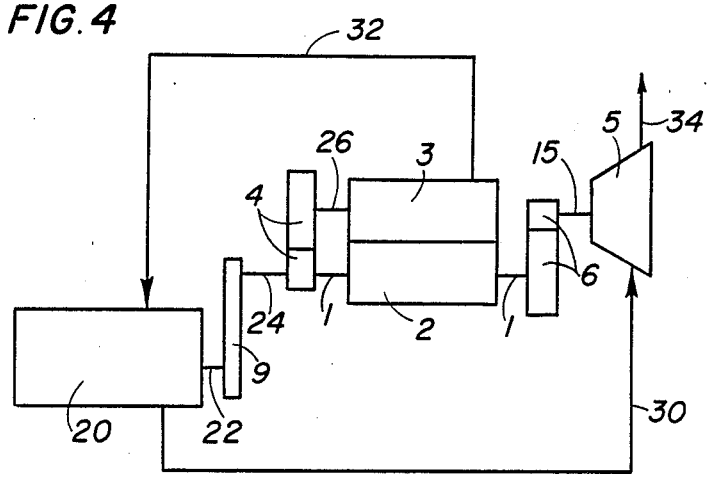
FIG. 4 is a schematic representation of the charging unit according to FIG. 2.

As can be seen in FIG. 4, the embodiment of FIG. 2 includes a connection between the belt drive 9 and a drive shaft 22 of an internal combustion engine 20. The output shaft 24 of the belt drive 9 is advantageously connected to the synchronizing gearing 4 which synchronizes the transmission of power from the internal combustion engine to shaft 1 of main rotor 2 and shaft 26 of secondary rotor 3. This gearing 4 may advantageously include a drive gear 28 and a driven gear 30. The driven gear 30 being coupled to shaft 26 of secondary rotor 3 whereas shaft 1 of the main rotor 2 may be directly coupled to the output shaft of the belt drive 9. As shown in FIG. 4 (schematically) the shaft 1 of the main rotor 2 may be directly coupled to transmission gearing 6 (including a gear 13 which in turn is coupled to gear 14) for rotation of the shaft 15 of gas turbine 5. The diameters of the two gears may be chosen to allow for the different rotational speeds of the gas turbine 5 with respect to the rotors 2 and 3.

Figure 9:
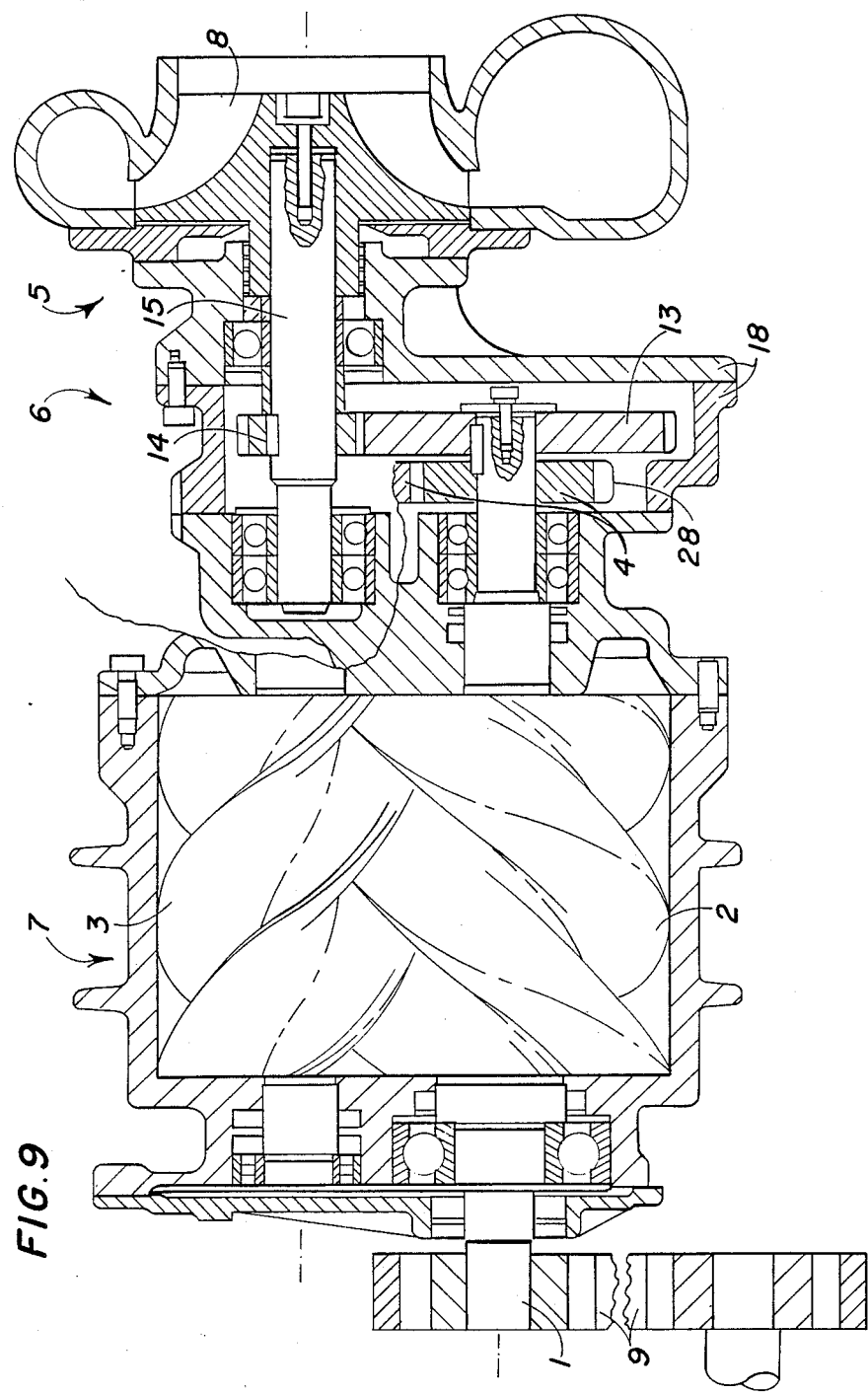
FIG. 9 is a constructional implementation similar to FIG. 7.

In FIG. 9 a gear wheel of the synchronizing gearing 4 and the gear wheel 13 of the transmission gearing 6 are arranged in overhung position next to each other on the shaft of the main rotor 2.

The second gear wheel of the synchronizing gearing 4 is arranged on the shaft of the secondary rotor 3 on the side toward the exhaust gas turbine. This gear wheel and the shaft end of the secondary rotor 3 are not evident in the representation in FIG. 9, since the exhaust gas turbine 5 with its bearing, for better representation, has been rotated into the common plane of the axes of the main rotor 2 and secondary rotor 3 (see schematic representation of FIG. 7).

The gear wheel 14 of the transmission gearing is, as in FIG. 2, arranged and supported on the shaft 15 of the exhaust gas turbine. The common gear housing 18 of the synchronizing and transmission gearing is flanged between the housing of screw charger 7 and exhaust gas turbine 5.

Figure 7:
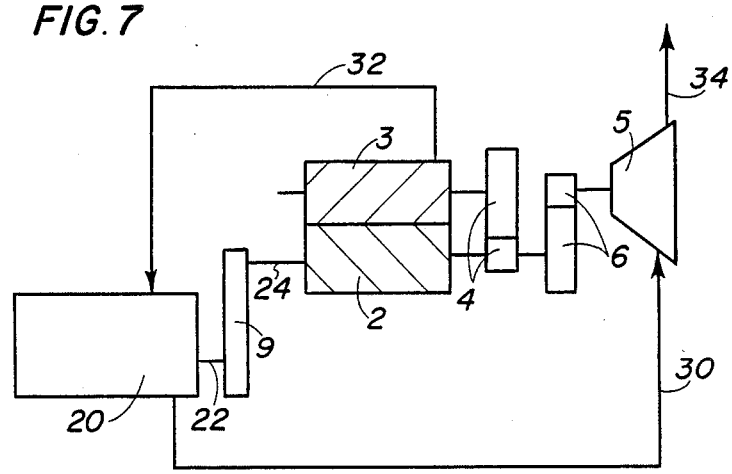
FIG. 7 is a schematic representation of a turbo screw charger with common housing of the synchronizing and transmission gearing on one side of the screw charger.

As can be seen from the schematic of FIG. 7, the embodiment shown in detail in FIG. 9 includes a similar transmission between a power shaft 22 of an internal combustion engine and a first transmission means including a belt drive 9. The output of the belt drive 9 is connected directly to the shaft 1 of the main rotor 2. As discussed above, the synchronizing gearing 4 and the transmission gearing 6 are arranged in a single common gear housing 18. FIG. 7 shows these features separately for a clearer understanding of the connections according to the invention.

Figure 10:
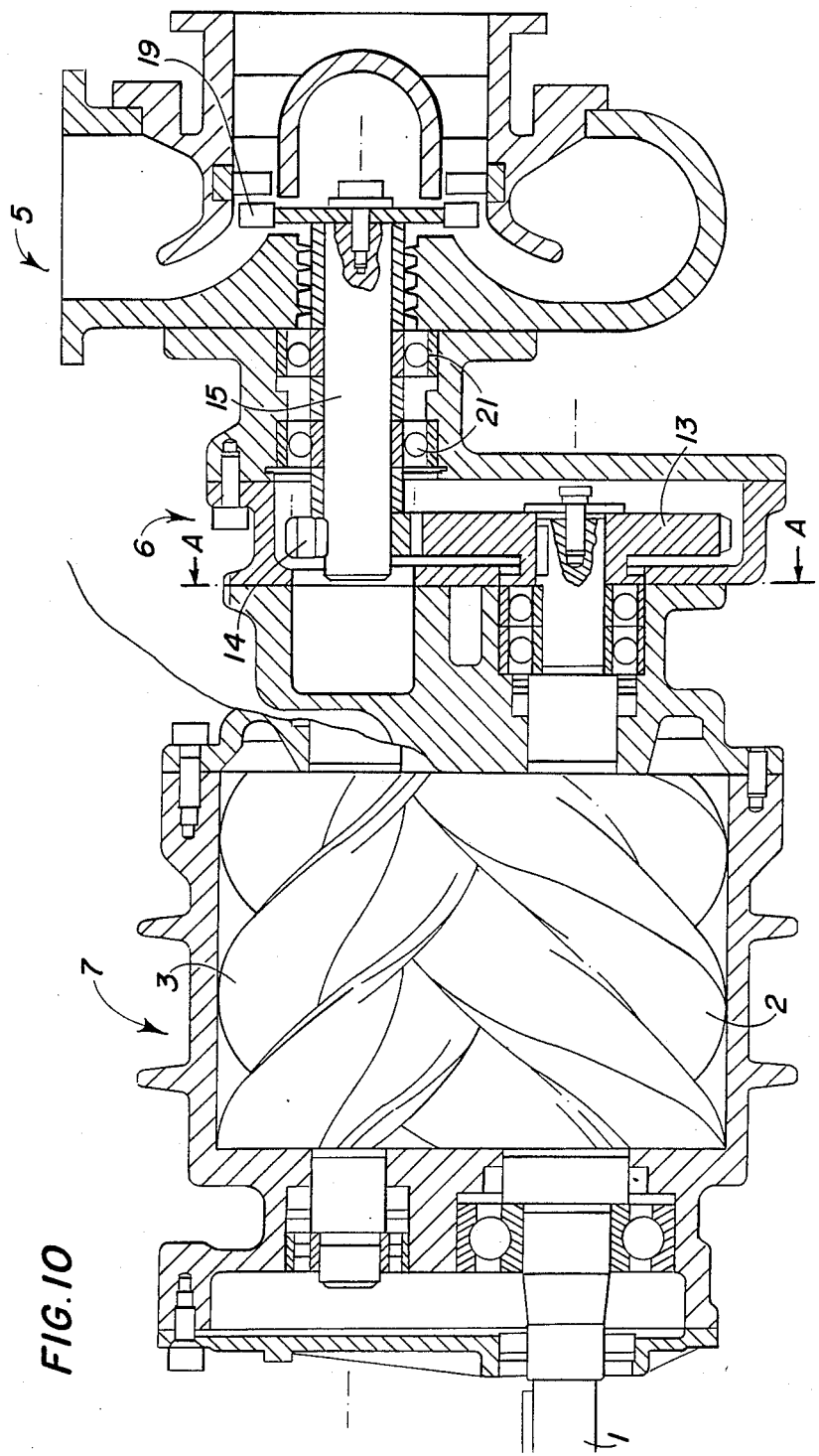
FIG. 10 is a constructional implementation similar to FIG. 8 with an axial turbine.

In FIG. 10 the secondary rotor 3 is driven directly via the tooth profiles of the main rotor 2 and the synchronizing gearing becomes superfluous. In the transmission gearing 6 between screw charger 7 and exhaust gas turbine 5 the gear wheel 13 is arranged in overhung position on the shaft of the main rotor 2, the gear wheel 14 in overhung position on the shaft 15 of the exhaust gas turbine 5. The exhaust gas turbine 5 is here implemented as axial turbine, with its runner 19 likewise arranged in overhung position on the end of shaft 15 opposite to the gear wheel 14 of the transmission gearing 6, which shaft extends between gear wheel 14 and runner 19 in bearings 21.

Figure 8:
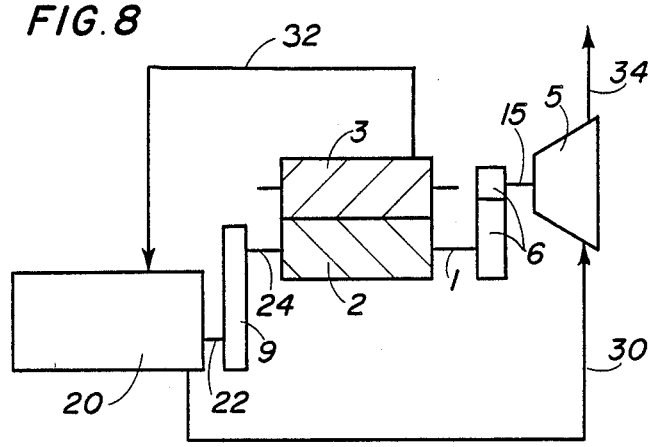
FIG. 8 is a schematic representation of a turbo screw charger with transmission gearing between main rotor and turbine as well as direct drive of the secondary rotor via the main rotor.

As can be seen in FIG. 8, the embodiment shown in detail in FIG. 10 includes a connection between a power shaft 22 of an internal combustion engine 20 and a transmission means including, for example, a belt drive 9 having an output shaft connected directly with shaft 1 of rotor 2 or being formed integral with shaft 1 of rotor 2. The secondary rotor 3 is driven upon rotation of the rotor 2 only by the toothed profiles of the two rotors. The main rotor shaft 1 is connected to the second transmission means including transmission gearing 6. This in turn is coupled to the exhaust gas turbine 5.

Figure 5:
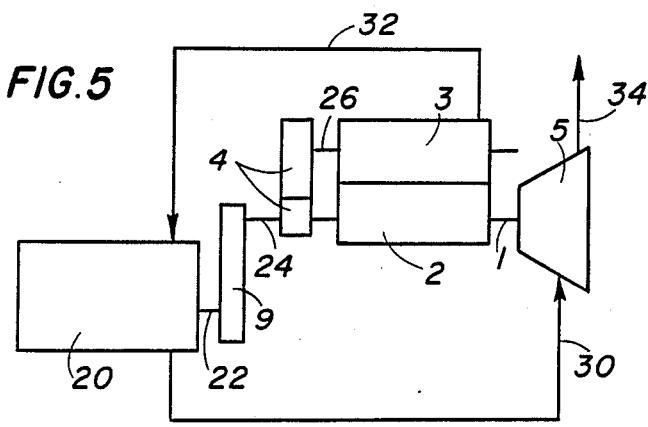
FIG. 5 is a schematic representation of a turbo screw charger with synchronizing gearing and direct turbine drive via the main rotor.
Figure 11:
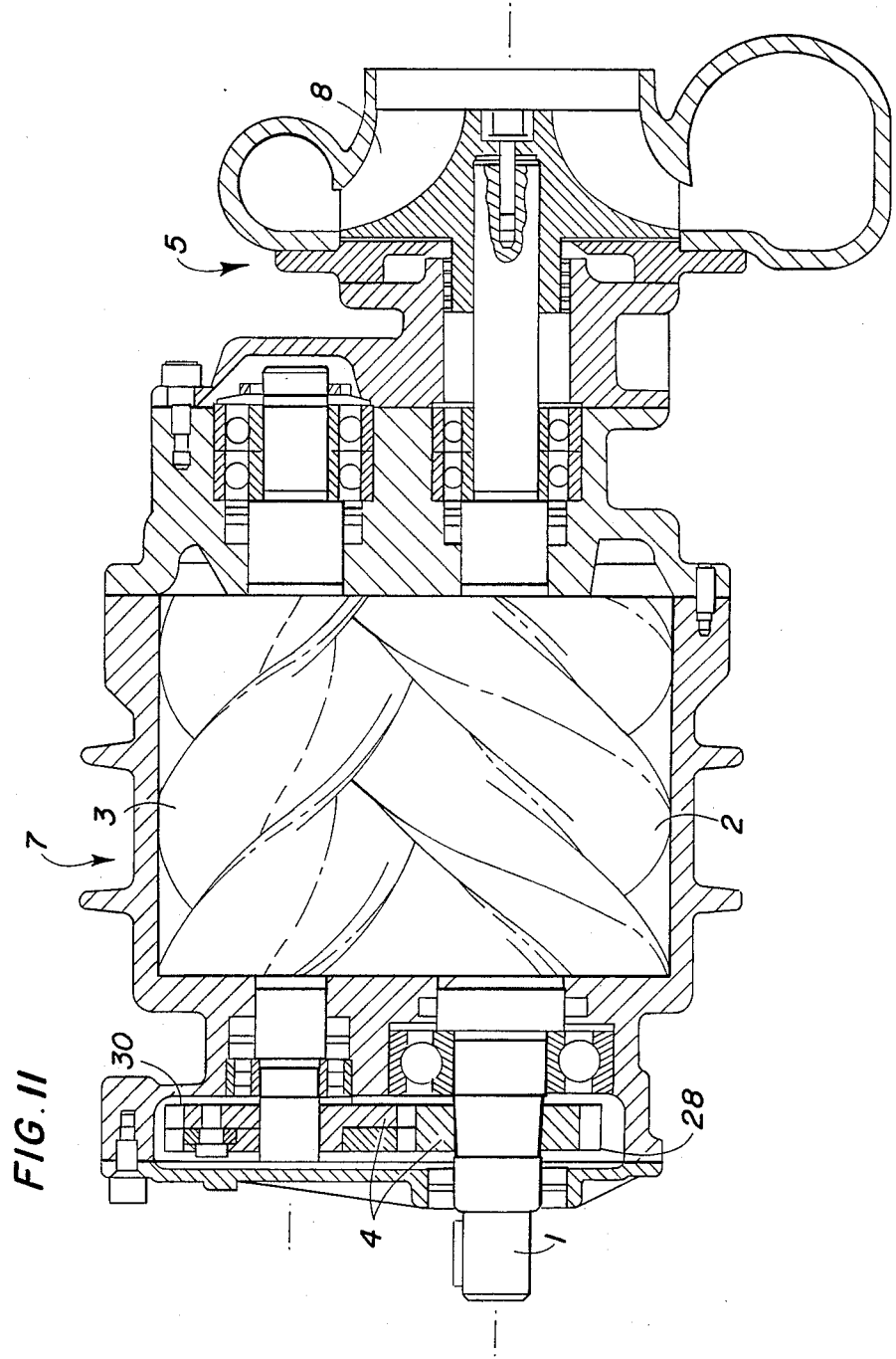
FIG. 11 is a construction implementation similar to FIG. 5.

As seen in FIG. 5, the embodiment shown in detail in FIG. 11 includes a connection between the first transmission means including a belt drive 9 and an output shaft 22 of an internal combustion engine 20. As in the embodiment of FIG. 2, the output of the belt drive 9 is connected to a synchronized gearing element 4 which drives the rotors 2 and 3. According to this embodiment, the shaft 1 of the main rotor 2 forms the drive of the exhaust gas turbine 5.

In FIG. 11 the runner 8 of the exhaust gas turbine 5 here implemented as radial turbine is arranged in overhung position on the shaft journal of the main rotor 2 of a screw charger 7.

Figure 6:
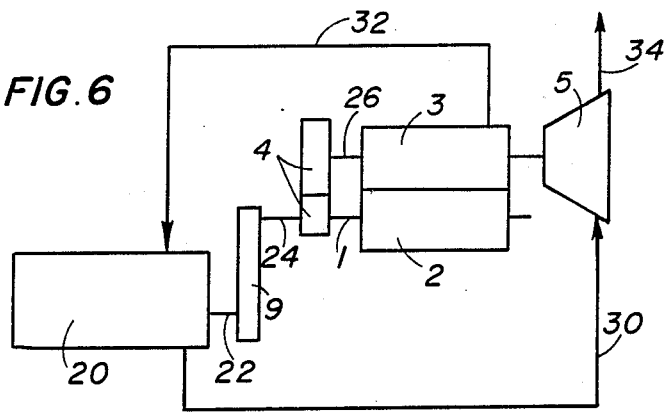
FIG. 6 is a schematic representation of a turbo screw charger with synchronizing gearing and direct turbine drive via the secondary rotor.

The embodiment shown in FIG. 6 is very similar to that of FIG. 5 except for the gas turbine 5 is directly connected to the shaft of the secondary rotor 3.

In FIGS. 2, 9 and 10 the exhaust gas turbine 5 for better representation has been rotated into the common plane of the axes of the main rotor 2 and secondary rotor 3.

In each of the embodiments shown in FIGS. 4-8, the exhaust gases from the I.C. engine 20 are directed, via the turbine exhaust intake line 30, through the turbine 5. The exhaust gases are expelled from the turbine through the turbine exhaust gas outake 34. The compressed gases leaving the screw charger are directed to the combustion chamber of the I.C. engine through the charging line 32.

While specific embodiments of the invention have been shown and described in detail to illustrate the application of the principles of the invention, it will be understood that the invention may be embodied otherwise without departing from such principles.

What is claimed is:

1. An internal combustion engine charging unit comprising:

a screw charger including a main rotor rotating about a main rotor shaft and a secondary rotor rotating about a secondary rotor shaft; a synchronizing gearing unit connected to said main rotor shaft and connected to said secondary rotor shaft for synchronizing the rotation of said main rotor and said secondary rotor, said synchronizing gearing unit being positioned on a first side of said screw charger, said main rotor shaft engaging a gear element in said synchronizing gearing unit; first transmission means connected to a drive shaft of the internal combustion engine and connected to said main rotor shaft, said main rotor shaft extending through said synchronizing gearing unit on said first side of said screw charger; an exhaust gas turbine having an intake connected to an exhaust of the internal combustion engine, said exhaust gas turbine having an exhaust gas outlet and a main shaft, said exhaust gas turbine being disposed on a second side of said screw charger; second transmission means connected to said exhaust gas turbine shaft and connected to said main rotor shaft, said second transmission means including a first gear element connected to a second gear element for changing the transmission ratio between said exhaust gas turbine shaft and said main rotor shaft, said second transmission means first gear element being directly connected to said main rotor shaft and said second gear element being directly connected to said exhaust gas turbine shaft.

2. An internal combustion charging unit according to claim 1, wherein said second transmission means is disposed in a housing and said screw charger is disposed in a housing, said second transmission means housing and said screw charger housing being connected at said second side of said screw charger, said exhaust gas turbine shaft being supported by a first bearing in said screw charger housing on said second side of said screw charger and said exhaust gas turbine shaft being supported by a second bearing connected to said second transmission means housing.

3. An internal combustion charging unit according to claim 1, wherein the exhaust gas turbine is a radial turbine.

4. An internal combustion charging unit according to claim 1, wherein the exhaust gas turbine is an axial turbine.

5. An internal combustion charging unit according to claim 1, wherein the exhaust gas turbine is arranged in an overhung position on a shaft journal of the second transmission means positioned between the displacement charger and the exhaust gas turbine.

* * * * *